United States Patent [19]

Yung

[11] Patent Number: 4,969,692
[45] Date of Patent: Nov. 13, 1990

[54] WHEEL BALANCING STRUCTURE

[75] Inventor: Wellington Yung, Hong Kong, Hong Kong

[73] Assignee: Vitality Motor Company, Ltd., Aberdeen, Hong Kong

[21] Appl. No.: 407,291

[22] Filed: Sep. 14, 1989

[51] Int. Cl.$^5$ .......................... B60B 3/00; B60B 19/00
[52] U.S. Cl. ....................................... 301/5 B; 301/65
[58] Field of Search ................ 301/5 B, 5 BA, 65; 73/573 R

[56] References Cited

U.S. PATENT DOCUMENTS

| | | | |
|---|---|---|---|
| 1,833,879 | 11/1931 | Ash | 301/5 B |
| 2,311,999 | 2/1943 | Purvis | 301/5 B |
| 2,955,876 | 10/1960 | Kinsey | 301/5 B |
| 2,998,282 | 8/1961 | Moyer | 301/5 B |
| 4,674,356 | 6/1987 | Kilgore | 301/5 BA X |

FOREIGN PATENT DOCUMENTS 534981 10/1955 Italy ................................. 301/5 B

*Primary Examiner*—Russell D. Stormer
*Attorney, Agent, or Firm*—Bertram F. Claeboe

[57] ABSTRACT

Wheel balancing structure for a motor vehicle is provided wherein a ring portion of the wheel rim radially inwardly of the rim outer flange features a plurality of circumferentially spaced holes or openings therethrough. Balancing weights preferably constructed of lead are particularly shaped for tight fitting relationship with one or more of the circumferentially spaced holes. Each hole is preferably of stepped configuration throughout the length thereof to accommodate at one end a plug securely closing said one end, and at its opposite end providing an entrant opening to facilitate removal of the balancing weight. Springs and spacers are disclosed for the purposes set forth. Among the advantages flowing from practice of the present invention is a marked improvement in the aesthetic appearance of the motor vehicle, as well as specifically noted mechanical improvements.

3 Claims, 2 Drawing Sheets

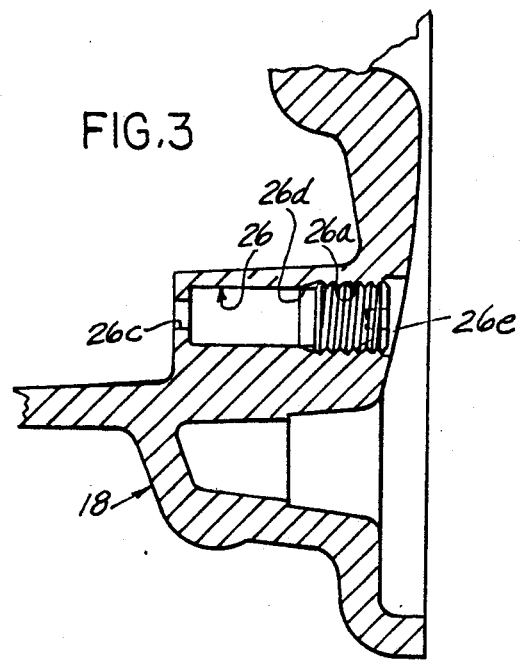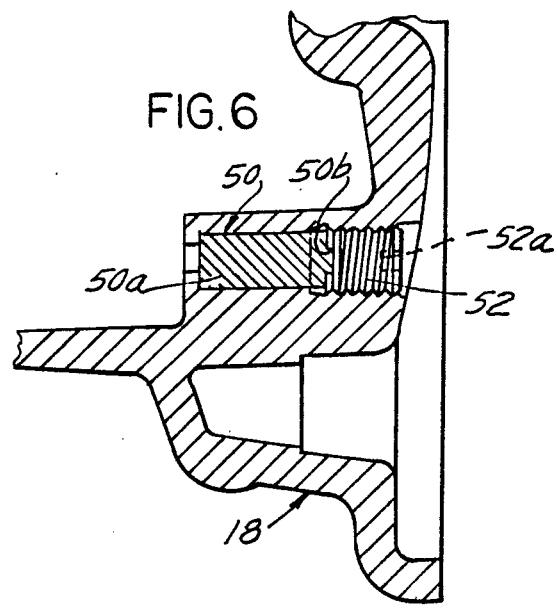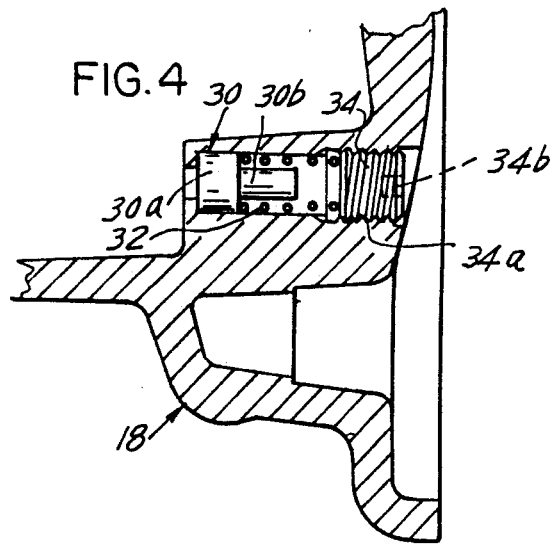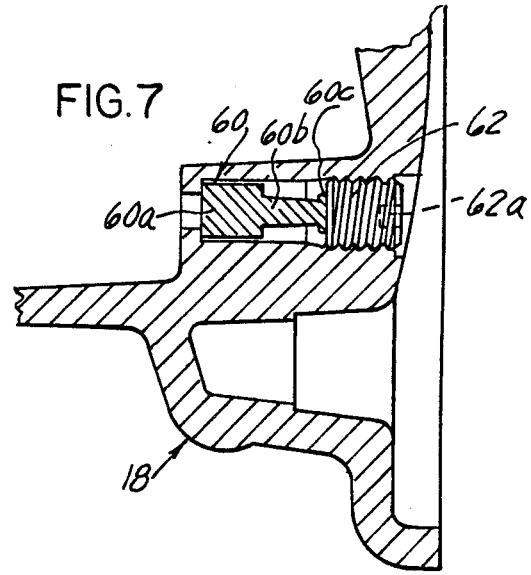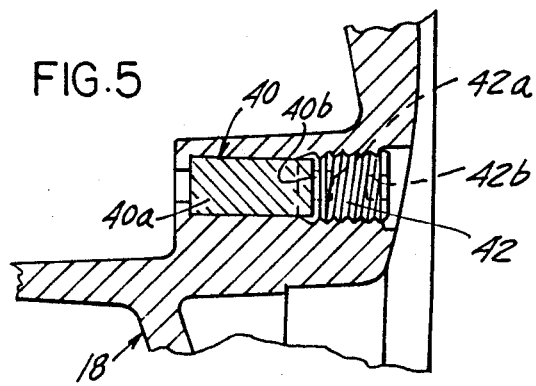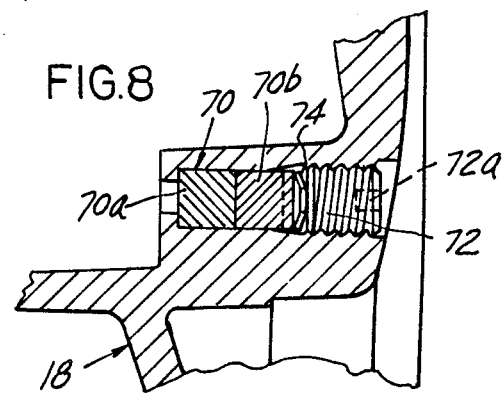

WHEEL BALANCING STRUCTURE

BACKGROUND OF THE INVENTION

It is known in the art to which this invention pertains that motor vehicle wheels must be balanced in order to eliminate an unbalance that may occur after mounting of the tire onto the rim, upon uneven tread wear, or any other change in the balance condition of the wheel. It is conventional to employ balance weights, which are placed beneath the rim flange and secured by means of a clasp or clip in over-lapping engagement with the rim flange. Numerous problems occur with this type of wheel balancing.

The mass ratios of the wheel vary due to non-uniform wear, requiring that the size and location of the balance weights be re-adapted. The old balance weights must be removed, and in so doing the attaching clip is generally deformed or broken, rendering reapplication of the weight infeasible or perhaps impossible. Weight removal gives rise to the possibility of damage to the rim, and since special tools are required for mounting and removing the weights, the services of an equipped mechanic are required.

An particularly with respect to modern cars of the sports type, the ready visibility of balance weights on the wheel rim detracts substantially from the beauty or aesthetic appearance of the car.

SUMMARY OF THE INVENTION

Applicant has discovered that the foregoing disadvantageous characteristics of prior art wheel balancing methods are effectively eliminated by the provision of balance weight receiving cavities within the wheel rim structure radially inwardly of the rim outer flange and circumferentially spaced therearound. Each of the cavities is open-ended, and is shaped to receive therewithin a metal body of accurately predetermined weight. Plug or stopper means preferably exteriorly threaded is effective to secure the metal body or balance weight within the cavity in tight fitting contact with the walls thereof.

The wheel balancing structure of this invention is relatively inconspicuous as compared with the exteriorly mounted balance weights of the prior art, and thereby enhances the overall aesthetic appearance of the motor vehicle. The structure provided by applicant additionally permits more precise balancing of the wheel, and the prior art problem of occasionally "throwing" a weight while driving is rendered essentially entirely remote.

BRIEF DESCRIPTION OF THE DRAWINGS

FIG. 3 is a fragmentary sectional view through rim structure of this invention and showing an empty balance weight receiving cavity; and FIGS. 4 through 8 are views taken in the manner of FIG. 3, and showing various exemplary forms of the wheel balancing structure of this invention.

DESCRIPTION OF THE PREFERRED EMBODIMENT

Figure 1:
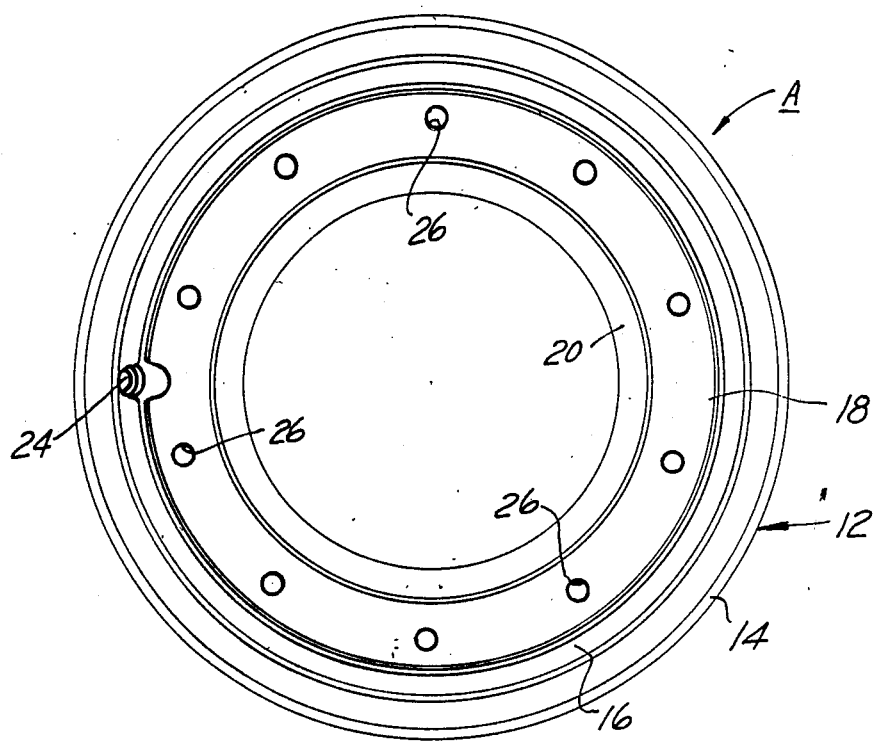
FIG. 1 is a side elevational view of wheel structure embodying this invention.
Figure 2:
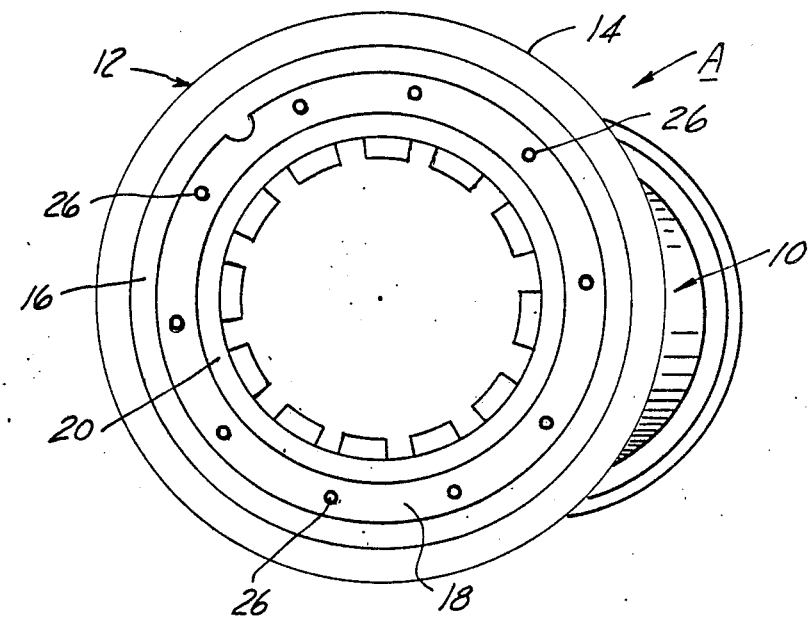
FIG. 2 is a side perspective view thereof.

Referring now first to FIGS. 1 and 2 of the drawings, a rim and wheel assembly incorporating the novel aspects of this invention is designated generally therein by the legend A. In the interest of brevity of the disclosure, only those parts of the assembly A pertinent to the instant invention will be specifically described herein.

The rim and wheel assembly A shown in FIGS. 1 and 2 comprises wheel structure 10 integrated with rim structure 12, the latter being shaped to include an outer flange section 14 connecting with an inner flange section 16. The generally one-piece rim structure 12 further comprises outer and inner ring sections 18 and 20, respectively, and as is conventional, the inner ring section 20 mounts a removable hubcap 22, which may be of either plastic or metal construction. As is also conventional, the assembly A also includes air insertion means 24.

The outer ring section 18 is provided with a plurality of circumferentially spaced holes or openings 26 functioning importantly as balance weight receiving cavities. Referring now particularly to FIG. 3, each hole or open-ended passage 26 in the outer ring section 18 is of stepped configuration, and includes a relatively large diameter mouth or entrant portion 26a, a connecting relatively lesser diameter central portion 26b, and a relatively small diameter end portion 26c, which provides a means for knocking out and thereby removing the balance weight for replacement or other reasons. The juncture of the mouth and central portions 26a and 26b of each hole 26 may be tapered as at 26d, and the mouth or entrant portion may be internally threaded as at 26e.

The wheel balancing structure of this invention is provided in various shapes and weights, depending upon the wheel balance condition presented. Exemplary forms of applicant's contribution to the art are shown in FIGS. 4 through 8, and in each embodiment of the invention now to be described, firm fitting engagement is made with the wall structure of the stepped hole 26 providing the balance weight receiving cavity.

Referring now to FIG. 4 of the application drawings, there is shown in installed position in hole 26 provided in wheel rim outer ring section 18 balancing weight 30 comprised of a relatively large diameter generally cylindrical base portion 30a and a generally cylindrical reduced diameter shank or stem portion 30b integral therewith. Resilient means 32, which may take the form of the coil spring shown, bears at one end against one wall of the balancing weight base portion 30a, encircles the stem or shank portion 30b of the weight, and at its opposite end is in spring-pressed relation with one surface of plug or stopper means 34. Of course, the axial length of the stem or neck portion 30b could be greater than that shown, even to the extent as to be in abutment with plug means 34.

The composition of the plug means 34 may be either metal or plastics, and the outer diameter thereof may be threaded as at 34a for engagement with threads 26e on the inner diameter of the mouth or entrant portion 26a of the hole 26. Plug means 34 further at one end thereof may be recessed as at 34b to receive tightening means, which may be of the hexagonal wrench type or means equivalent thereto.

In work performed to date, the balancing weights of this invention are either 10 or 20 grams. However, depending on the conditions presented, the exemplary weights may vary. Again by way of illustration only, the dimensions of the stepped hole 26 may vary. Typically, in the embodiment of FIG. 4, the overall axial length of the hole may be approximately 38 centimeters, the balancing weight 30a length of about 16 centimeters, and the plug means 34 an outer diameter of approximately 12 centimeters. As stated, wide variations in these illustrative dimensions may be noted depending upon operating conditions. A preferred material for the balancing weights shown and described herein is lead.

The embodiment of applicant's invention shown in FIG. 5 includes a balancing weight 40 formed with a generally cylindrical body portion 40a and relatively short length reduced diameter neck portion 40b. The latter portion is sized and shaped to mate with cylindrical cavity 42a formed in one end of plug means 42, and recessed at its opposite end as at 42b to accommodate tightening means in the manner noted in connection with FIG. 4.

The cavity 42a in the plug means 42 may not at all times be required, and this is shown in FIG. 6. Balancing weight 50 illustrated therein is shaped to include a generally cylindrical body portion 50a formed at one end with a reduced diameter neck portion 50b adapted for abutment with one wall of plug means 52 equipped with a tool receiving necess 52a therein.

A variation in the balancing weight 30 of FIG. 4 is shown to FIG. 7, to which reference is now made. Balancing weight 60 of the latter view is provided with a relatively short length generally cylindrical body portion 60a integrated with an elongated neck portion 60b enlarged to include a head portion 60c. Also provided by this embodiment of the invention is generally cylindrical plug means 62 smooth surfaced at one end for abutment with head portion 60c of balancing weight 60, and recessed at its opposite end as at 62a to accommodate tightening means, as previously described.

Under certain conditions it may be found desirable to employ spacer means between the balancing weight and the plug means, and this is illustrated in FIG. 8. Balancing weight 70 shown therein is generally cylindrical throughout its length, and may be comprised of two separate identical segments or sections 70a and 70b. Plug or stopper means 72 of FIG. 8 corresponds to like means in FIG. 7, and interposed between balancing weight section 70b and plug means 72 is spacer means 74. A device known to the art as a cup washer generally satisfies the requirement for the spacer means 74 shown.

Reference was made earlier herein to the relatively small diameter end or exit portion 26c of hole 26 in the outer ring section 18 of the rim and wheel assembly A. This opening 26c provides a convenient means for the insertion therein of a suitable tool to dislodge any of the balancing weights 30, 40, 50, 60, 70, or modifications thereof from the hole 26, after of course removal of the plug means 34, 42, 52, 62, or 72, respectively.

Various changes and modifications to the wheel balancing structure of the present invention have been discussed herein, and these and other modifications may of course be practiced without departing from the spirit of the invention or the scope of the subjoined claims.

I claim:

1. A rim and wheel assembly wherein said rim is provided with an outer rim flange thereon, annular means on said rim radially inwardly of the outer flange thereof provided with a plurality of circumferentially spaced holes thereon, balancing weights for tight securement in one or more predetermined holes in said annular means, and means for insertion in said one or more holes preventing movement of said balancing weight therein, each of said holes being of stepped configuration to make tight fitting contact with said balancing weights and also with said insertion means.

2. A rim and wheel assembly wherein said rim is provided with an outer rim flange thereon, annular means on said rim radially inwardly of the outer flange thereof provided with a plurality of circumferentially spaced holes therein, balancing weights for tight securement in one or more predetermined holes in said annular means, and means for insertion in said one or more holes preventing movement of said balancing weight therein, each of said holes having a relatively large diameter mouth portion, a relatively small diameter end portion, and an intermediate diameter portion, connecting with said mouth and end portions, in which each of said balancing weight sin sized for firm location within said intermediate diameter portion, said insertion means being adapted to effect firm closure of said mouth portion, thereby restraining each of said balancing weights against movement relative to said intermediate diameter portion.

3. A rim and wheel assembly wherein said rim is provided with an outer rim flange thereon, annular means on said rim radially inwardly of the outer flange thereof, provided with a plurality of circumferentially spaced holes therein, balancing weights for tight securement in one or more predetermined holes in said annular means, and means for insertion in said one or more holes preventing movement of said balancing weight therein, each of said balancing weights being shaped to include a generally cylindrical body portion and connecting neck portion, the body portion of each of said balancing weights having a diameter no less than the diameter of each of said holes, each of said balancing weights and each of said insertion means being so dimensioned as to length whereby in combination they substantially entirely occupy each of said holes.

* * * * *